(12) United States Patent
Raz et al.

(10) Patent No.: US 8,983,710 B2
(45) Date of Patent: Mar. 17, 2015

(54) METHODS AND SYSTEMS FOR DETERMINING DRIVING PERFORMANCE VARIABLES

(75) Inventors: Ofer Nissim Raz, Tel-Aviv (IL); Oren Musicant, Tel-Aviv (IL)

(73) Assignee: Greenroad Driving Technologies Ltd., Beit Dagan (IL)

( * ) Notice: Subject to any disclaimer, the term of this patent is extended or adjusted under 35 U.S.C. 154(b) by 171 days.

(21) Appl. No.: 13/544,869

(22) Filed: Jul. 9, 2012

(65) Prior Publication Data
US 2013/0018541 A1   Jan. 17, 2013

(30) Foreign Application Priority Data

Jul. 14, 2011   (IL) .......................................... 214092

(51) Int. Cl.
*G01M 17/00* (2006.01)
*B60W 50/00* (2006.01)
*B60W 40/09* (2012.01)
*G08G 1/01* (2006.01)
*B60T 8/88* (2006.01)
*G06Q 10/06* (2012.01)

(52) U.S. Cl.
CPC ......... *B60W 50/0098* (2013.01); *G08G 1/0104* (2013.01); *B60T 8/885* (2013.01); *G06Q 10/06* (2013.01); *B60W 40/09* (2013.01); *B60W 2530/14* (2013.01)
USPC ............ 701/29; 701/30.5; 701/32.1; 701/117

(58) Field of Classification Search
CPC ....... B60T 8/885; G06Q 10/06; G08G 1/0104
USPC .................................. 701/29, 30.5, 32.1, 117
See application file for complete search history.

(56) References Cited

U.S. PATENT DOCUMENTS

| | | | |
|---|---|---|---|
| 5,546,305 A | 8/1996 | Kondo | |
| 5,570,087 A | 10/1996 | Lemelson | |
| 5,805,079 A | 9/1998 | Lemelson | |
| 6,438,472 B1 | 8/2002 | Tano et al. | |
| 6,714,894 B1 * | 3/2004 | Tobey et al. | 702/188 |
| 6,879,969 B2 * | 4/2005 | Engstrom et al. | 706/20 |
| 7,389,178 B2 | 6/2008 | Raz et al. | |

(Continued)

OTHER PUBLICATIONS

William Strunk Jr. and E.B. White, The Elements of Style, 1979, all pages.*

*Primary Examiner* — Calvin Cheung
(74) *Attorney, Agent, or Firm* — Dekel Patent Ltd.; David Klein

(57) ABSTRACT

Methods and systems are provided for determining a value of an event performance variable associated with a driving event, and/or for determining a session performance variable associated with at least one driving session. The method comprising: identifying a driving event which occurred during a driving session of a vehicle; providing a plurality of indicators associated with such a driving event; retrieving respective values for each of the plurality of indicators from one or more sensors located in the vehicle being driven; providing a mathematical relationship that represents the event performance variable as a function of the plurality of indicators, wherein the mathematical relationship represents an event of the type characterizing the identified driving event; and determining value of the event performance variable based on the mathematical relationship provided, by applying the values retrieved for each of the plurality of indicators.

3 Claims, 3 Drawing Sheets

(56) References Cited

U.S. PATENT DOCUMENTS

| | | |
|---|---|---|
| 8,258,934 B2 * | 9/2012 | Filev et al. .................... 340/435 |
| 8,565,964 B2 * | 10/2013 | Tanoue et al. ................ 701/33.4 |
| 2002/0128751 A1 | 9/2002 | Engstrom et al. |
| 2005/0116829 A1 * | 6/2005 | Koenig et al. ................ 340/576 |
| 2006/0253307 A1 * | 11/2006 | Warren et al. .................... 705/4 |
| 2007/0001831 A1 | 1/2007 | Raz et al. |
| 2008/0065427 A1 * | 3/2008 | Helitzer et al. ................... 705/4 |
| 2009/0287374 A1 * | 11/2009 | Kuramori et al. ............... 701/41 |
| 2012/0196252 A1 * | 8/2012 | Jensen et al. .................... 434/62 |
| 2014/0170602 A1 * | 6/2014 | Reed ............................... 434/62 |

\* cited by examiner

METHODS AND SYSTEMS FOR DETERMINING DRIVING PERFORMANCE VARIABLES

BENEFIT CLAIM; CROSS-REFERENCE TO RELATED APPLICATIONS

This application claims the benefit under 35 U.S.C. 119 of priority to Israel Patent Application No. 214092, filed Jul. 14, 2011, the entire contents of which is hereby incorporated by reference for all purposes as if fully set forth herein.

TECHNICAL FIELD

The present disclosure generally relates to monitoring systems in vehicles and methods for using them, and more particularly to techniques for analyzing data collected during one or more driving sessions.

BACKGROUND

In the recent years an increasing number of vehicles are being equipped with monitoring systems that supervise the way the vehicle is being driven, by capturing real-time data and providing the driver of the vehicle with objective evaluation, thereby enabling him/her to determine the quality of his/her driving performance. Monitoring systems are mainly used to confirm the safety of the driver performance by facilitating the collection of qualitative and quantitative information related to factors that contribute to the occurrence of accidents. Installing monitoring systems in vehicles have proved to assist in mitigating the probability of a vehicle being involved in an accident. In addition, monitoring systems may also be used to analyze other aspects of the driver's driving performances such as fuel consumption, driving habits etc.

There are several monitoring systems and methods to utilize them that are known in the art. Most of the systems described in the art classify the driver safety performance based upon measurements taken by sensors installed in the vehicle being driven. The sensors may provide information regarding the speed, time, acceleration, location of the vehicle and so on. The basic monitoring systems use a simple threshold mechanism. For example, U.S. Pat. No. 6,438,472 describes a system that analyzes raw driving data (such as speed and acceleration data) in a statistical fashion to obtain statistical aggregates that can be used to evaluate the driver's performance. Unsatisfactory driver behavior is determined when certain predefined threshold values are exceeded. Driver, whose behavior exceeds a statistical threshold from a pre-defined "safe" driving, is deemed to be a "dangerous" driver.

Another solution is described in U.S. Pat. No. 7,389,178, which is incorporated herein by reference, by which a somewhat more sophisticated monitoring system is described. The underlying idea of the solution suggested by U.S. Pat. No. 7,389,178 is that an ordinary statistical threshold-based analysis mechanism fails to recognize dangerous driving patterns. Thus, the monitoring system disclosed in this publication dismantles a driving session into a plurality of maneuvers (e.g. lane changing, making turns etc.) and provides a safety score for each maneuver based on the performance of that maneuver by the driver, which is derived from related parameters values as measured by the sensors.

Yet, it is still required to improve on the available solutions for evaluating drivers' performances.

SUMMARY OF THE DISCLOSURE

The disclosure may be summarized by referring to the appended claims. It is an object of the present invention to provide method and system for determining a value of an event performance variable associated with a given driving event.

It is another object of the present invention to provide a driver of a vehicle with indications on his driving performances.

Other objects of the invention will become apparent as the description of the invention proceeds.

According to one embodiment of the invention a method is provided for determining a value of an event performance variable ("EPV") associated with a driving event, the method comprising:

identifying a driving event which occurred during a driving session of a vehicle;

providing a plurality of indicators associated with a driving event of a type that characterizes the identified driving event (e.g. of a driving event of the same type as the identified driving event);

retrieving respective values for each of the plurality of indicators associated with the identified driving event from one or more sensors located in the vehicle being driven. In addition or in the alternative, values for these of indicators may be retrieved from other sources e.g. driver performance history, driver details, weather updates, calendar data etc.;

providing a mathematical relationship that represents the event performance variable as a function of the plurality of indicators, wherein the mathematical relationship represents an event of the type characterizing the identified driving event; and determining a value for the event performance variable based on the mathematical relationship provided by applying the values retrieved for each of the plurality of indicators.

In the following description, the term "driving session" (also known as "driving trip") as used herein throughout the specification and claims, describes a period of time that begins when the driver starts the engine of the vehicle, and ends when the driver turns off the engine of the vehicle. The scenario, where the vehicle has not moved at all during the period of time while the engine was running, will not be considered to be encompassed by the term of a driving session. Typically, during one driving session there is a plurality of associated driving events. Nevertheless, the event performance variable is preferably determined for individual driving events independently of other driving events comprised in that driving session and/or the event performance variable associated with such other events.

According to another embodiment, the EPV, i.e. the event performance variable, represents the severity and/or safety and/or fuel consumption efficiency and/or any other applicable feature associated with the driving domain that is associated with the identified driving event. In the following description, the term "event performance variable" as used herein throughout the specification and claims, should be understood to encompass any variable that is determined based on at least part of the data collected during the respective driving event. The event performance variable may be used to describe the performance level of the driving event, i.e. the event performance variable may provide an answer to any one of the following questions: how well was the driving event performed? Or, how safe was the driving event performed? Or, how economic (energy wise) was the performance of the driving event? and the like.

By another embodiment, the combination of the members belonging to the plurality of indicators associated with the type of the identified driving event is unique to that type of a driving event. The term "plurality of indicators", as used herein throughout the specification and claims, refers to parameters that represent a specific element of the driving event. An indicator may be a direct result of the measurement from the sensors' system e.g. maximum speed, maximum acceleration, the driving event starting time, etc. In addition or in the alternative, an indicator may be derived from a basic analysis of data retrieved from the sensors' system e.g. speed, average speed, speed variance, acceleration, average acceleration, acceleration variance, speed exceeding ratio (i.e. the maximum speed recorded at the event divided by speed limit), idling time, etc. The values of the members of a plurality of indicators are derived from data collected during the respective driving event. The term a "plurality of indicators", as used herein throughout the specification and claims, may also refer to parameters that represent a specific element of the driving session, mutatis mutandis.

The term "driving event" as used throughout the specification and claims, includes any pattern in the data collected by the one or more sensors located in the vehicle being driven during the driving session which can be identified based on comparison with a driving event library. There may be several types of driving events e.g. braking into turn, accelerating, lane changing, braking while in curve, acceleration up hill, U turn, etc.

According to yet another embodiment, the method further comprising a step of retrieving the period during which the identified driving event has been carried out, and wherein the mathematical relationship provided represents event performance variable as a function of the plurality of indicators. In such a case, the value of the event performance variable is preferably determined based on the mathematical relationship provided, by applying the values retrieved for each of the plurality of indicators and of time duration of a driving event.

According to a related embodiment, the method further comprising:
  providing a plurality of pre-determined coefficients associated with the plurality of indicators;
  assigning one or more pre-determined coefficients, selected from among the plurality of pre-determined coefficients, to each of the plurality indicators; and
  applying the values retrieved for each of the plurality of indicators and the value of the retrieved time duration, taken together with the pre-determined coefficients as were assigned to their respective indicators, to determine the value of the event performance variable based on the mathematical relationship.

The term "plurality of pre-determined coefficients", as used herein throughout the specification and claims, is used to denote a group of numeral parameters that may be used in determining the event performance variable. The pre-determined coefficients may be used to mathematically manipulate the value of one or more members of the plurality of indicators, by assigning to each indicator a pre-determined coefficient based on its contribution (importance) to the overall value of the event performance variable or by assigning such pre-determined coefficients to indicators in order to obtain the indicators in their normalized form.

According to a related embodiment, the plurality of pre-determined coefficients is determined based upon at least one environmental factor. Explicitly, the plurality of pre-determined coefficients may be determined based upon factors which are not related to the driving session e.g. driver performance history, driver details, weather updates, the location of the vehicle, the speed limit, and the like. The at least one environmental factor may change during the driving session (e.g. a driver first drives in a area where the speed limit it 40 Kmh, and later on drives in an area where the speed limit is 80 Kmh)

According to a different embodiment, a system is provided for determining a value of an event performance variable associated with a driving event, the system comprising:
  at least one sensor adapted to collect data that relates to a driver's performance during a driving session of a vehicle (a typical set of sensors comprises: a tachometer, a speedometer, a GPS receiver and a "multi-axis" accelerometer which is capable of monitoring multiple independent vector accelerations along more than a single axis. Other optional additional sensors may be sensors for driver braking pressure, accelerator pressure, steering wheel control, handbrake, turn signals, and transmission or gearbox control);
  a processor adapted to:
    identify, based on the data collected, a driving event which occurred during the driving session;
    retrieve respective values for a plurality of indicators associated with the identified driving event, wherein the plurality of indicators are associated with a driving event of a type that characterizes the identified driving event (e.g. of the same type as the identified driving event);
    determine the value of the event performance variable based on a mathematical relationship by applying the respective values for the plurality of indicators, wherein the mathematical relationship represents an event performance variable being a function of the plurality of indicators.

According to another embodiment, the event performance variable determined by the processor represents the economy (energy wise) and/or severity and/or safety and/or driving performance of the identified driving event.

In accordance with yet another embodiment, the combination of the members that belong to the plurality of indicators retrieved by the processor and associated with the type of the identified driving event is unique to that type of a driving event.

In another embodiment, the processor is further configured to determine the value of the event performance variable based on a mathematical relationship, by applying the respective values for the plurality of indicators, wherein the mathematical relationship represents an event performance variable being a function of the plurality of indicators.

In a related embodiment, the processor is further adapted to:
  assign one or more pre-determined coefficients, selected from among a plurality of pre-determined coefficients, to each of the plurality of indicators;
  apply one or more values associated with respective one or more pre-determined coefficients and the time duration associated with the identified driving event, to determine the value of the event performance variable based on the mathematical relationship.

According to another aspect of the invention a computer program product encoding a computer program stored on a non-transitory computer readable storage medium for executing a set of instructions by a computer system comprising one or more computer processors is provided for carrying out a method for determining a value of an event performance variable associated with a driving event, the method comprising: identifying a driving event which occurred during a driving session of a vehicle; providing a plurality of indicators associated with a driving event type that characterizes the identified driving event; retrieving respective values for each of the plurality of indicators associated with the identified driving event and the duration of the period during which said identified driving event took place; providing a mathematical relationship that represents the event performance variable as a function of the plurality of indicators and of time duration of a driving event, wherein the mathematical relationship represents an event of the type characterizing the identified driving event; and determining value of the event performance variable based on the mathematical relationship provided, by applying the values retrieved for each of the plurality of indicators and of the retrieved time duration.

According to another embodiment the computer program product encoding a computer program stored on a non-transitory computer readable storage medium for executing a set of instructions by a computer system comprising one or more computer processors is provided for carrying out a method for determining a value of a event performance variable associated with a driving event that was identified by a separate entity (by the vehicle's monitoring system, by a third-party server etc.).

According to another aspect of the invention, there is provided a method for determining a value for a session performance variable associated with one or more driving sessions, the method comprising:

identifying at least one driving session (for a specific vehicle or for a specific driver or for a specific combination of a driver and a vehicle) for a pre-determined period of time (e.g. last 7 days, from the beginning of the year, last 12 months and a like) of a vehicle and retrieving its/their respective time duration;

providing a plurality of indicators associated with the at least one identified driving session;

retrieving respective values for each of the plurality of indicators associated with the at least one identified driving session from one or more sensors located in the vehicle being driven;

providing a mathematical relationship that represents the session performance variable as a function of the plurality of indicators; and determining value of the session performance variable based on the mathematical relationship provided, by applying the values retrieved for each of the plurality of indicators.

As will be appreciated by those skilled in the art, in the case that the session performance value (SPV) is derived from a number of driving sessions, a single SPV may be calculated based on data received from the number of driving sessions, or in the alternative a number of SPVs may be determined, each associated with its respective driving session.

According to yet another embodiment of this aspect of the invention, the time duration is a member of a group comprising of: a single driving session, a week, a month, and the like.

In accordance with yet another embodiment, the indicators are selected from a group that comprises: maximum speed, speed variance, acceleration variance, time above a pre-defined speed limit, time spent while driving in eco speed, speed variability, sum over accelerating events scores, sum over braking events scores, and the like.

By still another embodiment there is provided a system for determining a value of a session(s) performance variable associated with a driving session(s), the system comprising:

at least one sensor adapted to collect data that relates to a driver's performances during a driving session of a vehicle;

a processor adapted to:
retrieve respective values for a plurality of indicators associated with the driving session; and
determine the value of the session performance variable based on a mathematical relationship by applying the respective values for the plurality of indicators, wherein the mathematical relationship represents a session performance variable being a function of the plurality of indicators.

BRIEF DESCRIPTION OF THE DRAWINGS

For a more complete understanding of the present invention, reference is now made to the following detailed description taken in conjunction with the accompanying drawings wherein:

FIG. 2A to 2C demonstrate a way of implementing Eq. 1 to determine the value of the driving performance, wherein:

FIG. 2A—presents three graphs which shows the value for the $EPV_{speeding}$ during three driving events when the speed limit is 50 Km/h;

FIG. 2B—presents three graphs which shows the value for the $EPV_{speeding}$ during three driving events when the speed limit is 80 Km/h; and FIG. 2C—presents three graphs which shows the value for the $EPV_{speeding}$ during three driving events when the speed limit is 120 Km/h.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details.

One embodiment of the present invention discloses a method and a system for determining a value of an event performance variable associated with a selected driving event. The value of the event performance variable may be used in a Scoring Mechanism (SM) practiced in driving monitoring systems. The scoring mechanism is a set of rules implemented over a driver's one or more driving sessions based on collected data (e.g. driving events and driving time) in order to provide an idea about the degree at which the respective drivers are being involved in risky behaviors, how safe do they drive, or how well (economy wise or performance wise) do they drive. The information about the driver performance may be provided to the drivers or to others, by any known communication channel (e.g. web site, e-mail messages, SMS etc.). Some scoring mechanisms known in the art consist of counting all driving events and summing them to present a score of the driver's performance. In those scoring mechanisms, all driving events receive equal weights. The SM presented in this disclosure allows adding additional event performance variables to enhance its matching to safety aspects, and uses multiple indicators to calculate each event performance variable. According to one embodiment each event performance variable has a value in the range of 0 and 1, although this scale may obviously be mathematically manipulated to provide 0 to 100 (or 0 to 1000, etc.) scores as required by the specific system.

Figure 1:
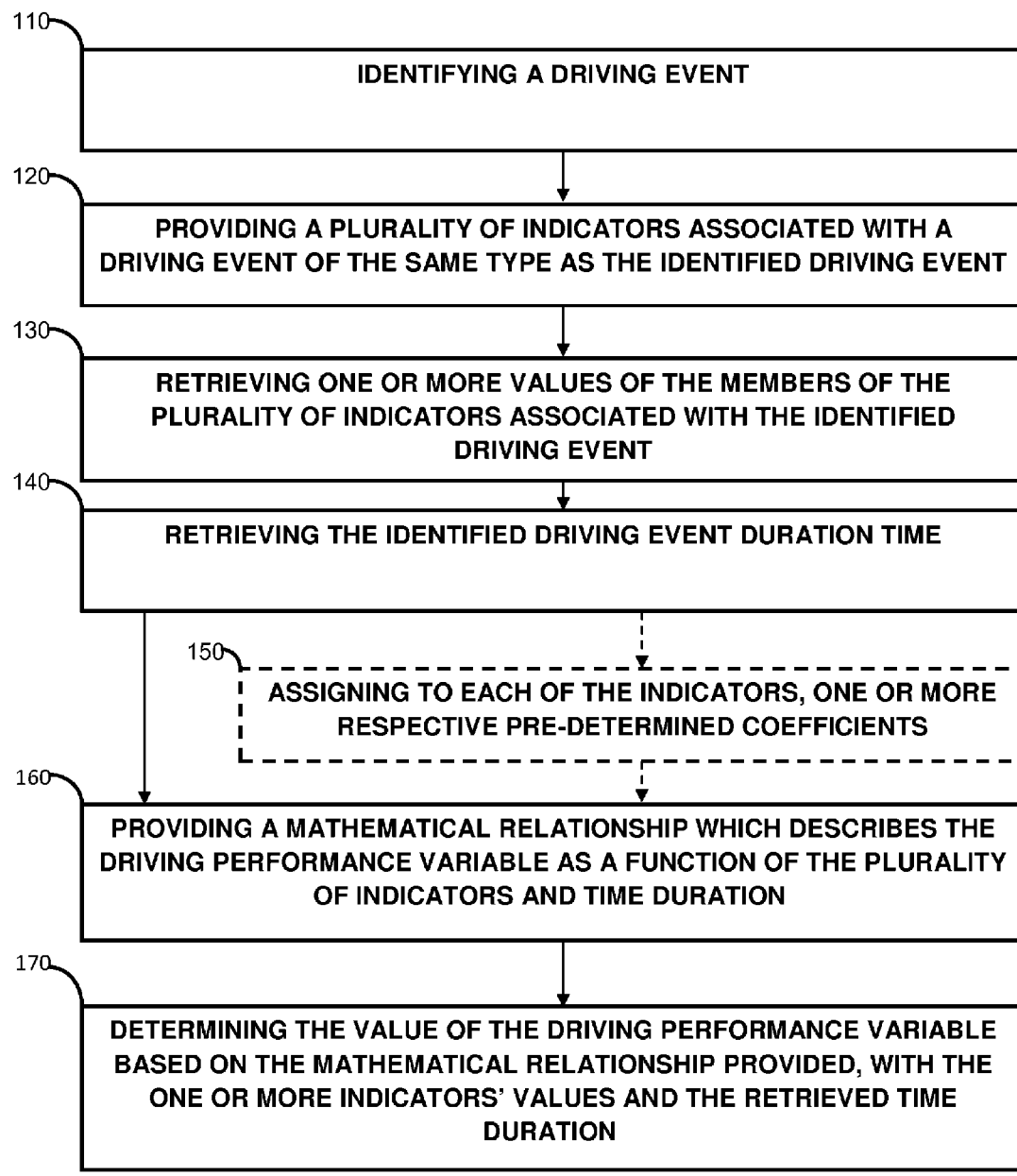
FIG. 1—presents a flow chart which demonstrates several embodiments.

The steps of the method provided by an embodiment of the invention are demonstrated in the flow chart presented in FIG. 1. The first step (110) is identifying a driving event which occurred during a driving session.

The identification may be done according to any method known in the art per se. For example, the identification may be based on the method described in U.S. Pat. No. 7,389,178. Next, in step (120) a plurality of indicators is provided, which are associated with a driving event being of the same type as the identified driving event. The number of members comprised in such a plurality of indicators may depend on the type of the driving event itself. For example, in order to determine the event performance variable $EPV_{speeding}$ two indicators are required, whereas in order to determine the event performance variable $EPV_{accelerating}$, four indicators would be required. In step (130), one or more values of the members of the plurality of indicators that are associated with the identified driving event are retrieved, followed by step (140) at which the duration time of the identified driving event is retrieved. The values of the members of the plurality of indicators and the driving event duration time are derived from data measured during the driving event. Upon retrieving the one or more values of the members of the plurality of indicators and the driving event duration time, the solution according to this embodiment includes an optional step of assigning to the plurality of indicators, one or more pre-determined coefficients (150) selected from among the plurality of pre-determined coefficients. For each type of a driving event, a mathematical relationship is provided (160). The mathematical relationship describes the event performance variable as a function of the plurality of indicators and time duration thereof. Next, a step of determining (170) the value of the event performance variable based on the mathematical relationship is carried out, wherein the retrieved one or more values and the time duration, are applied.

According to an embodiment of the invention, the event performance variable is determined by using the formula presented in Eq. 1

$$EPV_X = \frac{1}{1+e^{-(\beta_0^x+\beta_1^x \cdot I_1+\beta_2^x \cdot I_2+\ldots+\beta_n^x \cdot I_n)}} \quad \text{(Eq. 1)}$$

wherein x—is the type of the event performance variable, e.g., $EPV_{speed}$, $EPV_{accelerating}$, $EPV_{braking\ into\ turn}$.

$I_1, \ldots, I_n$—are the plurality of indicators e.g. SpeedExceedingRatio, EventDuration, Average Speed.

$\beta_0, \beta_1, \ldots, \beta_n$—are the plurality of pre-determined coefficients, which may be any rational number, positive or negative.

According to another embodiment, the event performance variable may be determined by using the formula presented in Eq. 2

$$EPV_X = 1 - \frac{1}{e^{(\beta_0^x+\beta_1^x \cdot I_1+\beta_2^x \cdot I_2+\ldots+\beta_n^x \cdot I_n)}} \quad \text{(Eq. 2)}$$

wherein x—is the type of the event (speed, accelerating, etc.)

$I_1, \ldots, I_n$—are the plurality of indicators $\beta_0, \beta_1, \ldots, \beta_n$—are the plurality of pre-determined coefficients, where typically each set is associated with the type of the event, x.

Figure 2A:
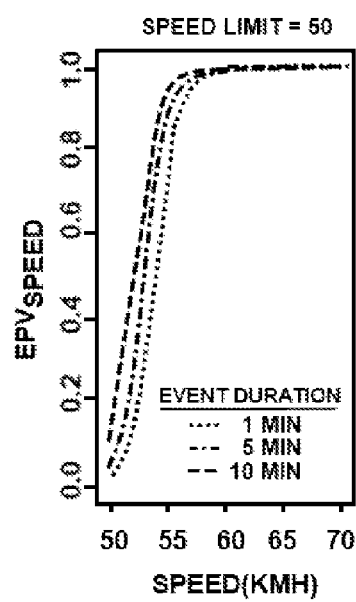
Figure 2B:
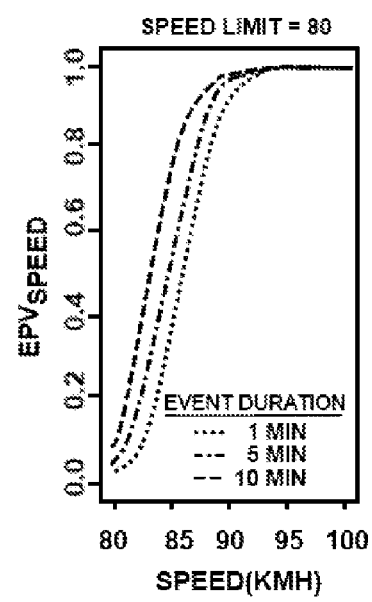
Figure 2C:
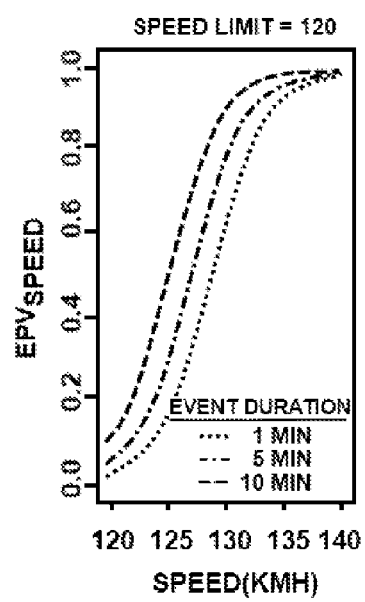

FIGS. 2A-2C demonstrate a way of implementing Eq. 1 to determine the value of the event performance variable in a speeding event, the event performance variable in this example describes the severity of the event. In this example the event performance variable is determined by two indicators and three pre-determined coefficients:

$I_1$=SpeedExceedingRatio: The maximum speed recorded at the event divided by speed limit minus 1. (MaxSpeed/SpeedLimit−1)

$I_2$=EventDuration: The duration of the event in seconds.

$\beta_0=-4$ $\beta_1=50$ $\beta_2=0.003$

The severity of the speeding event is given by the following formula $$EPV_{speeding} = \frac{1}{1+e^{-(-4+50*SpeedExceedingRatio+0.003*EventDuration)}}$$

FIG. 2A presents three graphs which show the value for the $EPV_{speeding}$ during three 25 events when the speed limit is 50 Km/h, FIG. 2B presents three graphs which show the value for the $EPV_{speeding}$ during three events when the speed limit is 80 Km/h, and FIG. 2C presents three graphs which show the value for the $EPV_{speeding}$ during three events when the speed limit is 120 Km/h.

As explained hereinbefore, according to another embodiment, the values of the event performance variables are collected per event over the driving session and are used to provide general information for the driver regarding his performance of certain events.

According to another embodiment, at least some of the indicators relate to data collected during one or more driving sessions rather than on a "per driving event" basis. These indicators may be mathematically manipulated to provide indication(s) on the driver's performances during a predetermined period of time e.g. weekly, monthly, last seven days, etc. Such indicators are for example maximum speed, speed variance, acceleration variance, time above a predefined speed limit, time spent while driving in eco speed, speed variability, sum over accelerating scores, sum over braking scores, and the like. In order to aggregate those indicators, the following guidelines may be used:

For an indicator that represents a sum (e.g. sum of EPVs, overall trip distance, time spent in Eco score), the data derived from all of the one or more driving session, is to be summed up.

For an indicator that represents an average (e.g. speed variability, acceleration variability), a weighted average for the driving session duration may be used.

According to this embodiment, the session(s) performance variable (SPV) may be determined, and is calculated in a way similar to the way that the EPV is calculated, mutatis mutandis. In order to calculate the SPV the following equation may be used:

$$SPV_X = \frac{1}{1+e^{-(\beta_0^x+\beta_1^x \cdot I_1+\beta_2^x \cdot I_2+\ldots+\beta_n^x \cdot I_n) \cdot Duration^{a1} \cdot Distance^{a2}}} \quad \text{(Eq. 3)}$$

wherein a1 and a2 are determined based on the SPV type.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Figure 3:
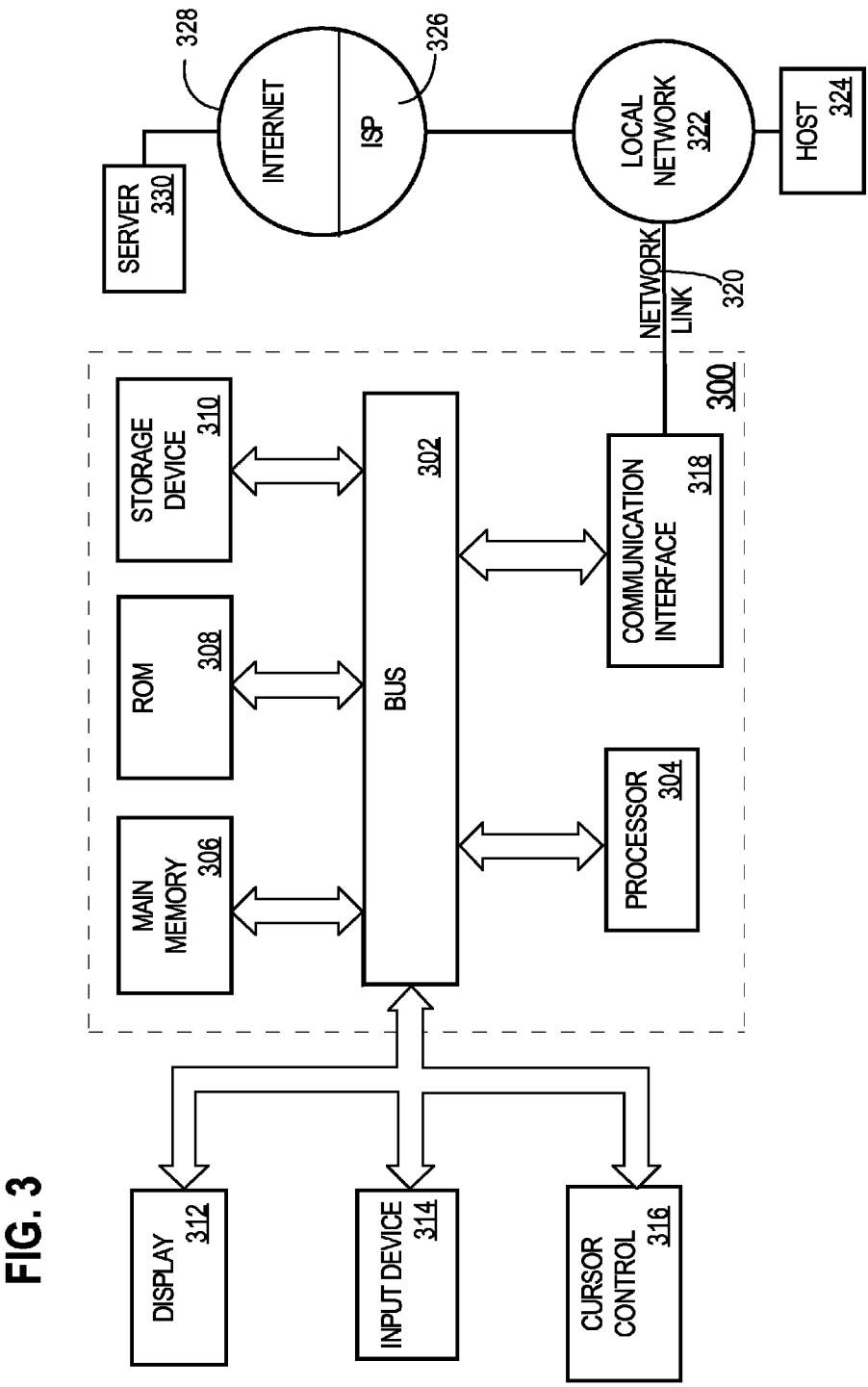
FIG. 3 illustrates a computer system with which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The terms "machine-readable medium" and "computer program product encoding a computer program stored on a non-transitory computer readable storage medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method for evaluating an identified driving event comprising:
   identifying a driving event which occurred during a driving session of a vehicle;
   providing a plurality of indicators associated with a driving event of a type that characterizes the identified driving event;
   using a processor to retrieve respective values for each of the plurality of indicators associated with the identified driving event from a plurality of sensors located in the vehicle being driven;
   providing a mathematical relationship for calculating with the processor an event performance variable as a function of the plurality of indicators, wherein the mathematical relationship represents an event of the type characterizing the identified driving event;
   providing a plurality of pre-determined coefficients associated with the plurality of indicators;
   assigning one or more pre-determined coefficients, selected from among the plurality of pre-determined coefficients, to each of the plurality of indicators;
   using the processor to evaluate the identified driving event by calculating the event performance variable by applying the values retrieved from said sensors for each of the plurality of indicators together with the pre-determined coefficients in the mathematical relationship; and
   wherein the plurality of pre-determined coefficients is determined based upon a wherein the plurality of pre-determined coefficients is determined based upon a weather condition during the driving session of the vehicle, and
   utilizing the identified driving event to help improve driving safety.

2. A method for evaluating an identified driving event comprising:
   identifying a driving event which occurred during a driving session of a vehicle;
   providing a plurality of indicators associated with a driving event of a type that characterizes the identified driving event;
   using a processor to retrieve respective values for each of the plurality of indicators associated with the identified driving event from a plurality of sensors located in the vehicle being driven;
   providing a mathematical relationship for calculating with the processor an event performance variable as a function of the plurality of indicators, wherein the mathematical relationship represents an event of the type characterizing the identified driving event;
   providing a plurality of pre-determined coefficients associated with the plurality of indicators;
   assigning one or more pre-determined coefficients, selected from among the plurality of pre-determined coefficients, to each of the plurality of indicators;
   using the processor to evaluate the identified driving event by calculating the event performance variable by applying the values retrieved from said sensors for each of the plurality of indicators together with the pre-determined coefficients in the mathematical relationship;
   wherein the plurality of pre-determined coefficients is determined based upon a speed limit during the driving session of the vehicle, and
   wherein said pre-determined coefficients change in accordance with a change in the speed limit during the driving session of the vehicle, and
   utilizing the identified driving event to help improve driving safety.

3. The method according to claim 1, wherein said pre-determined coefficients change in accordance with a change in the weather condition during the driving session of the vehicle.

* * * * *